United States Patent
Traeger et al.

(10) Patent No.: US 10,499,127 B2
(45) Date of Patent: Dec. 3, 2019

(54) HOUSING FOR A COMMUNICATION DEVICE AND COMMUNICATION DEVICE

(71) Applicant: Rohde & Schwarz GmbH & Co. KG, München (DE)

(72) Inventors: Robert Traeger, Riemerling (DE); Josef Koeppl, Zachenberg (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 224 days.

(21) Appl. No.: 15/373,307

(22) Filed: Dec. 8, 2016

(65) Prior Publication Data

US 2017/0257688 A1    Sep. 7, 2017

(30) Foreign Application Priority Data

Mar. 4, 2016 (EP) .................................. 16158715

(51) Int. Cl.
*H04R 1/02* (2006.01)
*H04B 1/3827* (2015.01)
*H04R 9/06* (2006.01)

(52) U.S. Cl.
CPC ............. *H04R 1/025* (2013.01); *H04R 1/026* (2013.01); *H04B 1/3827* (2013.01); *H04R 9/06* (2013.01); *H04R 2201/028* (2013.01); *H04R 2201/029* (2013.01); *H04R 2209/027* (2013.01); *H04R 2400/01* (2013.01); *H04R 2400/11* (2013.01); *H04R 2499/11* (2013.01)

(58) Field of Classification Search
CPC ...... H04R 1/025; H04R 1/026; H04R 1/3827; H04R 9/06; H04R 2201/028; H04R 2201/029; H04R 2209/027; H04R 2400/01; H04R 2400/11; H04R 2499/11
USPC ......................................................... 381/388
See application file for complete search history.

(56) References Cited

U.S. PATENT DOCUMENTS

| | | | |
|---|---|---|---|
| 4,821,331 A | 4/1989 | Murayama et al. | |
| 5,812,496 A * | 9/1998 | Peck | H04R 1/44 367/168 |
| 2015/0036862 A1 | 2/2015 | Chen et al. | |
| 2015/0110336 A1 | 4/2015 | Song | |
| 2016/0119718 A1 * | 4/2016 | Yang | H04R 9/02 381/351 |

FOREIGN PATENT DOCUMENTS

DE    28 45 694 A1    4/1980

OTHER PUBLICATIONS

Extended European Search Report from counterpart European Application No. 16158715.9, dated Aug. 10, 2016, 7 pp.

(Continued)

*Primary Examiner* — Sean H Nguyen
(74) *Attorney, Agent, or Firm* — Shumaker & Sieffert, P.A.

(57) ABSTRACT

A housing for a communication device comprises a first housing section with a membrane opening, wherein the first housing section comprises around the circumference of the membrane opening a first membrane support configured to couple to a sound membrane, and a magnet carrying support, which is integrally formed with the first housing section and is configured to support a magnet in the housing and below the membrane opening. Furthermore, the present invention provides a communication device.

21 Claims, 4 Drawing Sheets

(56) References Cited

OTHER PUBLICATIONS

Response to European Search Report dated Aug. 10, 2016, from counterpart European Application No. 16158715.9, filed on Mar. 1, 2018, 19 pp.
Examination Report from counterpart European Application No. 16158715.9, dated Nov. 7, 2018, 5 pp.
Examination Report from counterpart European Application No. 16158715.9, dated Apr. 3, 2019, 4 pp.

\* cited by examiner

HOUSING FOR A COMMUNICATION DEVICE AND COMMUNICATION DEVICE

PRIORITY CLAIM

This application claims the benefit of European Patent Application No. 16158715.9, filed Mar. 4, 2016; the disclosure of which is incorporated herein by reference in its entirety.

TECHNICAL FIELD

The invention relates to a housing for a communication device and a communication device.

BACKGROUND

Although applicable to any system that generates sounds, the present invention will be described in combination with communication devices, like e.g. radio transmitters or the like.

Modern radio transmitters are used in a variety of applications. Such applications include e.g. smartphones in private or public use, and radio equipment, which is especially used in public administrative applications, like in police equipment or military applications.

Specific applications like police or military applications require increased mechanical stability for the radio transmitters. One requirement for the radio transmitters can e.g. be to withstand accelerations of 30 g-50 g.

To withstand such severe conditions usually ruggedized speakers, like e.g. disclosed in U.S. Pat. No. 4,821,331, are used and the cases or housings, which carry the speakers, have to be reinforced to support the weight of the speaker at the respective accelerations.

Accordingly, there is a need for providing ruggedized equipment with less effort.

SUMMARY OF THE INVENTION

Therefore, the present invention provides a housing with the features of claim 1 and a communication device with the features of claim 15.

Accordingly, a housing for a communication device, comprises a first housing section with a membrane opening, wherein the first housing section comprises around the circumference of the membrane opening a first membrane support configured to couple to a sound membrane, also called diaphragm, which can e.g. be glued, soldered, molded or otherwise coupled to the membrane support, and comprises a magnet carrying support, which is integrally formed with the first housing section and is configured to support a magnet in the housing and below the membrane opening.

Further, the communication device comprises a housing according to the present invention.

The present invention is based on the conclusion that using a separate speaker and supporting such a speaker in a housing requires extensive and complex support structures.

Therefore, the present invention uses this knowledge and provides a housing for a communication device, which integrally incorporates the chassis of the speaker and/or a microphone and can be coupled to the remaining parts of the speaker or microphone, like e.g. the membranes or diaphragms. Therefore, the sound membrane can be a sound generation or speaker membrane as well as a microphone membrane.

A first housing section provides a membrane opening, in which the membrane can be positioned and coupled to the first housing section via a first membrane support. The membrane support can e.g. be a recess from the outer surface of the first housing section around the inner circumference of the membrane opening. A sound membrane can e.g. be glued or soldered to the recess. As an alternative, the membrane can also be integrally molded with the membrane support. That means that the membrane is of the same material as the first membrane support. Any of the above variants can be used to provide a sealed, e.g. waterproof, connection between the membrane and the respective membrane support.

In that case, the membrane can e.g. be molded as a flat piece of plastic material, which is surrounded by the first housing section. It is to be understood that the first membrane support in this case can simply be the circumference of the membrane opening.

To make up a speaker in the housing, some kind of driving element has to be included in the housing. Usually permanent magnets are used in combination with a bobbin on the membrane to excite the membrane. Therefore, the first housing section can comprise the magnet carrying support, which is integrally formed with the first housing section. The magnet carrying support can receive and secure a permanent magnet, which is the exciting element of the speaker assembly. That means that no separate parts have to be joined and fixed to support the required accelerations. Instead, a single part will form the housing for the communication device and at the same time the chassis of the speaker.

The present invention provides the possibility to integrate a speaker into a communication device without the need to secure a separate speaker in the communication device with great mechanical effort. Therefore, the present invention reduces the complexity of the communication device.

Further embodiments of the present invention are subject of the further subclaims and of the following description, referring to the drawings. It is to be understood that the independent claims of one category can be developed according to the features of the subclaims pertaining to another independent claim.

In a possible embodiment, the magnet carrying support can comprise a number, e.g. one or more, of magnet fastening elements configured to fasten the magnet to the magnet carrying support. A permanent magnet, which in combination with a bobbin drives the membrane can be easily secured or fastened to the magnet carrying support using the fastening elements.

In a possible embodiment, the magnet fastening elements can comprise drill holes for screwing the magnet to the magnet carrying support. In addition or as an alternative, the magnet fastening elements can comprise clamps configured to clamp the magnet to the magnet carrying support. Finally, in addition or as an alternative, the magnet fastening elements can comprise clips configured to hold the magnet onto the magnet carrying support. Different types of fastening elements allow choosing for every application the adequate type of fastening element and optimize the magnet support for the respective application.

In a possible embodiment, the housing can comprise a permanent magnet, which is coupled to the magnet carrying support. That means that the permanent magnet can be provided as part of the housing and the communication device only has to provide e.g. an electronic control circuit.

In a possible embodiment, the magnet can at least partially be molded into the magnet carrying support. Molding the magnet into the magnet carrying support provides improved mechanical stability for the magnet.

In a possible embodiment, the housing comprises a second membrane support, which can be positioned between the magnet carrying support and the membrane opening and is configured to couple with a centering membrane. Centering membranes are used to hold the sound membrane in position horizontally, i.e. orthogonally to the excitation direction of the sound membrane. By providing the second membrane support, all further elements of the speaker can therefore be fixed to the housing without the need to provide a separate chassis for the speaker.

In a possible embodiment, the second membrane support is integrally formed with the magnet carrying support, e.g. in the direction of the membrane opening on top of the magnet carrying support. With this configuration, no separate second membrane support has to be provided.

In a possible embodiment, the housing comprises a sound membrane, which is coupled to the first membrane support, and comprises a centering membrane, which is coupled to the sound membrane and the second membrane support. The housing can provide the complete speaker including all membranes and the permanent magnet. Therefore, no separate speaker chassis is therefore necessary with the present invention.

In a possible embodiment, the sound membrane comprises, e.g. in its center, a coil, also called voice coil or voice coil bobbin, which is positioned over the magnet carrying support, such that the coil in combination with the permanent magnet can actuate the coil and therefore make the sound membrane vibrate. The coil can also be used as a sensor to sense the excitation of the sound membrane. In this case, the sound membrane forms part of a microphone-like device.

In a possible embodiment, the sound membrane and the centering membrane can be integrally formed with each other. In addition or as an alternative, the sound membrane and the centering membrane can comprise paper and/or tissue and/or plastic. Further, in addition or as an alternative, the sound membrane and the centering membrane can comprise fiber reinforcements. The membrane can therefore be adjusted to a specific application according to any combination of the above-mentioned possibilities.

In a possible embodiment, the housing can comprise a second housing section, which is configured to couple to the first housing section and closes the first section except for the membrane opening. The second housing section can e.g. be a flat section and close a back opening of the first housing section or a side opening of the first housing section.

In a possible embodiment, the first housing section can form a closed chassis except for the membrane opening. That means that the first housing section alone forms the housing and the only opening is the membrane opening.

In a possible embodiment, the first housing section or the second housing section comprises a cable feedthrough, especially a sealed cable feedthrough, e.g. for contacting the coil from the outside, e.g. from a respective driving circuit.

In a possible embodiment, the housing can comprise a circuit compartment for a driving circuit, especially wherein the circuit compartment can be provided in the first housing section and the second housing section when mounted to the first housing section closes the circuit compartment.

The above embodiments and developments can, where practical, be combined with one another in any way. Further possible embodiments, developments and implementations of the invention also include combinations that have not been mentioned explicitly of features of the invention described above or below in relation to the embodiments. In particular, a person skilled in the art will also add individual aspects as improvements or additions to the particular basic form of the present invention.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

Figure 1:
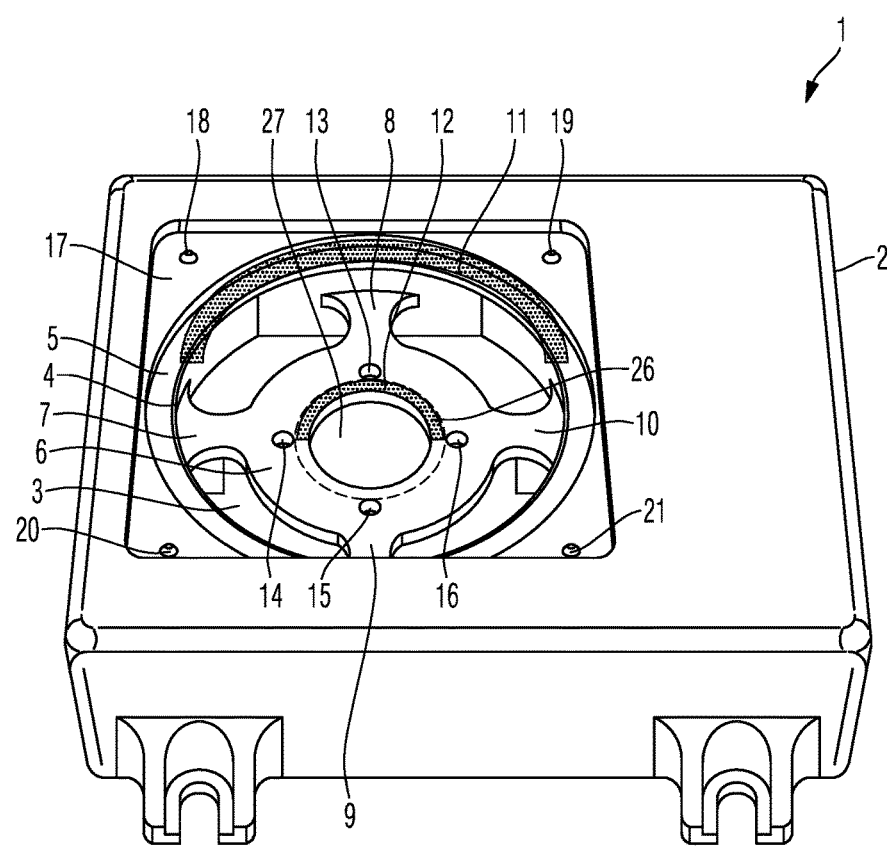
FIG. 1 shows a perspective view of an embodiment of a housing according to an embodiment of the present invention.

The enclosed drawings are intended to provide further understanding of the embodiments of the invention. They illustrate embodiments and, in conjunction with the description, serve to explain principles and concepts of the invention. Other embodiments and many of the stated advantages can be found from the drawings. The elements of the drawings are not necessarily shown in scale with one another.

In the figures of the drawing, any elements and components that are identical, have the same function and work in the same way, are each given the same reference signs, unless stated otherwise.

DETAILED DESCRIPTION OF THE INVENTION

Figure 3:
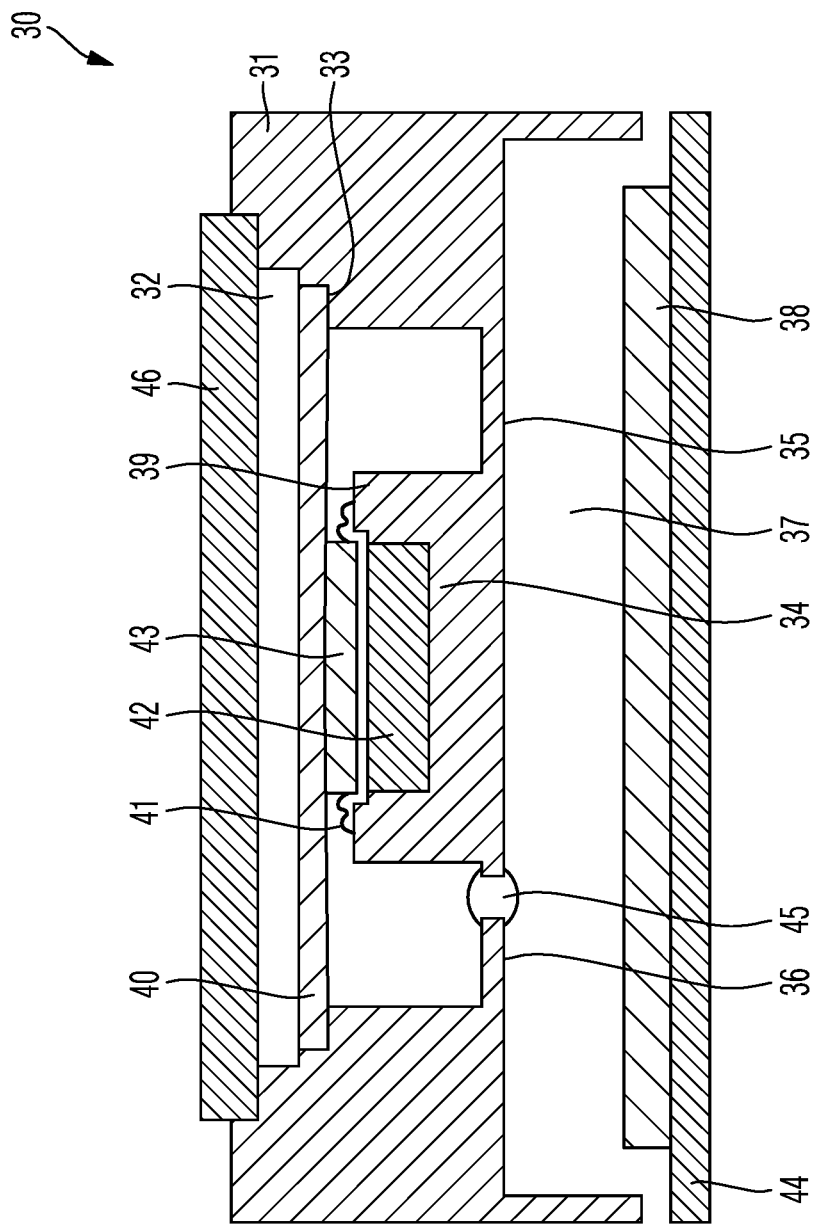
FIG. 3 shows a cross sectional view of another embodiment of a housing according to an embodiment of the present invention.
Figure 4:
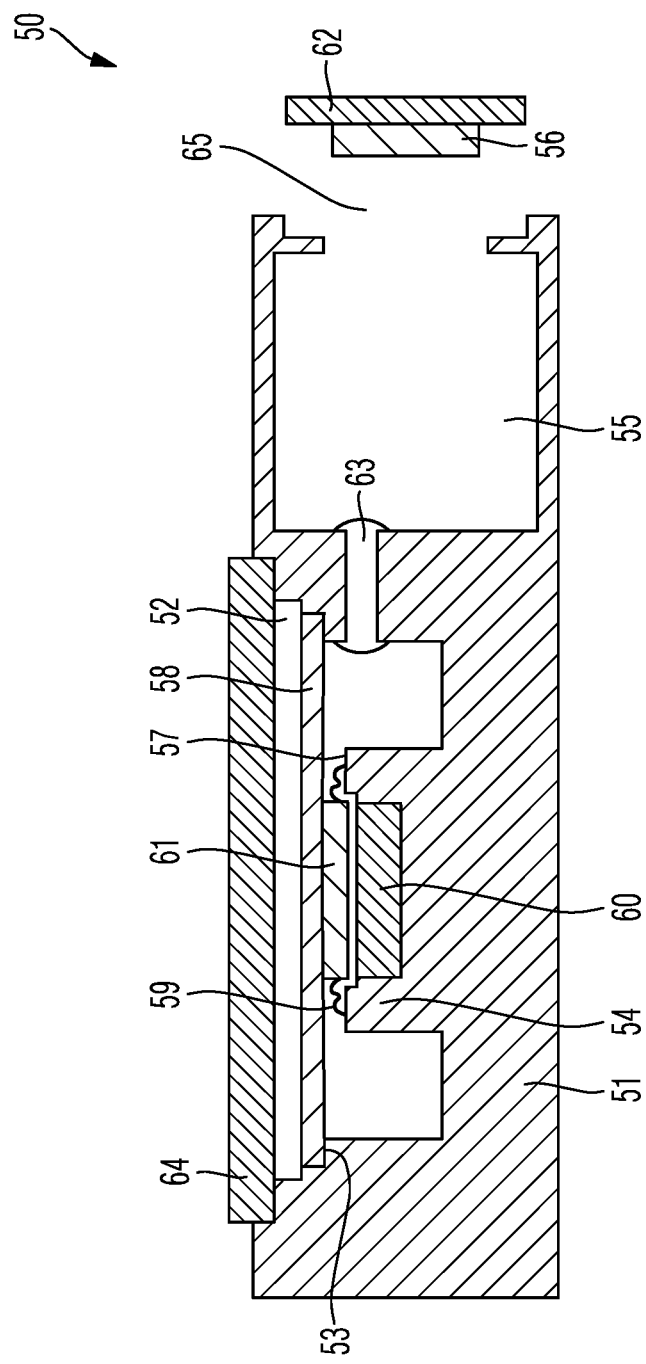
FIG. 4 shows a cross sectional view of another embodiment of a housing according to an embodiment of the present invention.

FIG. 1 shows a perspective view of a housing 1 for a communication device where a sound generation membrane is used as sound membrane (see FIGS. 3 and 4).

A first housing section 2 comprises a membrane opening 3, where a sound generation membrane can be fixed to the first housing section 2. To allow easily fixing the sound generation membrane to the first housing section 2 a first membrane support 5 in the form of a recess from the surface of the first housing section 2 is provided around the circumference 4 of the membrane opening 3. Further, a strip of glue 11 is just exemplarily positioned on the first membrane support 5, which can be used to glue the sound generation membrane to the membrane support 5.

Starting from the circumference 4 of the membrane opening stands 7-10 support a magnet carrying support 6 below the middle of the membrane opening 3, such that a permanent magnet (see FIGS. 3 and 4) can be positioned below the center of the sound generation membrane to drive the excitation of the sound generation membrane. The magnet carrying support 6 further provides drill holes 13-16, which can be used to screw the permanent magnet to the magnet carrying support 6.

Further on the inner circumference of the magnet carrying support 6 a hole 27 is provided, through which the permanent magnet might extend in the direction of a coil of the sound generation membrane or vice versa. On the upper side of the magnet carrying support 6 around the hole 27 a strip of glue 12 is provided to fix a centering membrane (see FIGS. 3 and 4), which holds the coil and the sound generation membrane in position.

The complete setup of membrane opening 3, first membrane support 5, and magnet carrying support 6 is set down from the upper surface of the first housing section 2. A recess 17 is provided around the membrane opening 3, which comprises drill holes 18-21. In the recess 17 a cover (see FIGS. 3 and 4) can be provided to cover the sound generation membrane and therefore protect it from environmental stress.

The housing 1 of FIG. 1 is formed by a single element, which can e.g. be milled from a block of aluminum, plastic or the like. The housing 1 can also be molded or otherwise machined. This also implies that all of the above-described elements, i.e. especially the first membrane support 5 and the magnet carrying support 6, are integrally formed with the first housing section 2.

In FIG. 1 the permanent magnet can be screwed to the magnet carrying support 6 and the sound generation membrane as well as the centering membrane is glued to the respective supports 5, 26. These types of fixations are just exemplary and it is to be understood that any other type of fixation can be used.

The permanent magnet can for example be soldered to the magnet carrying support 6 and/or fixed with clamps or clips to the magnet carrying support 6. The permanent magnet can also be at least partially molded into the magnet carrying support 6.

The same applies to the sound generation membrane and the centering membrane, which can be soldered to the respective supports 5, 26. As an alternative, especially if the housing is produced by mold injection, at least one of the membranes can be molded integrally with the housing 1 of the first housing section 2.

Figure 2:
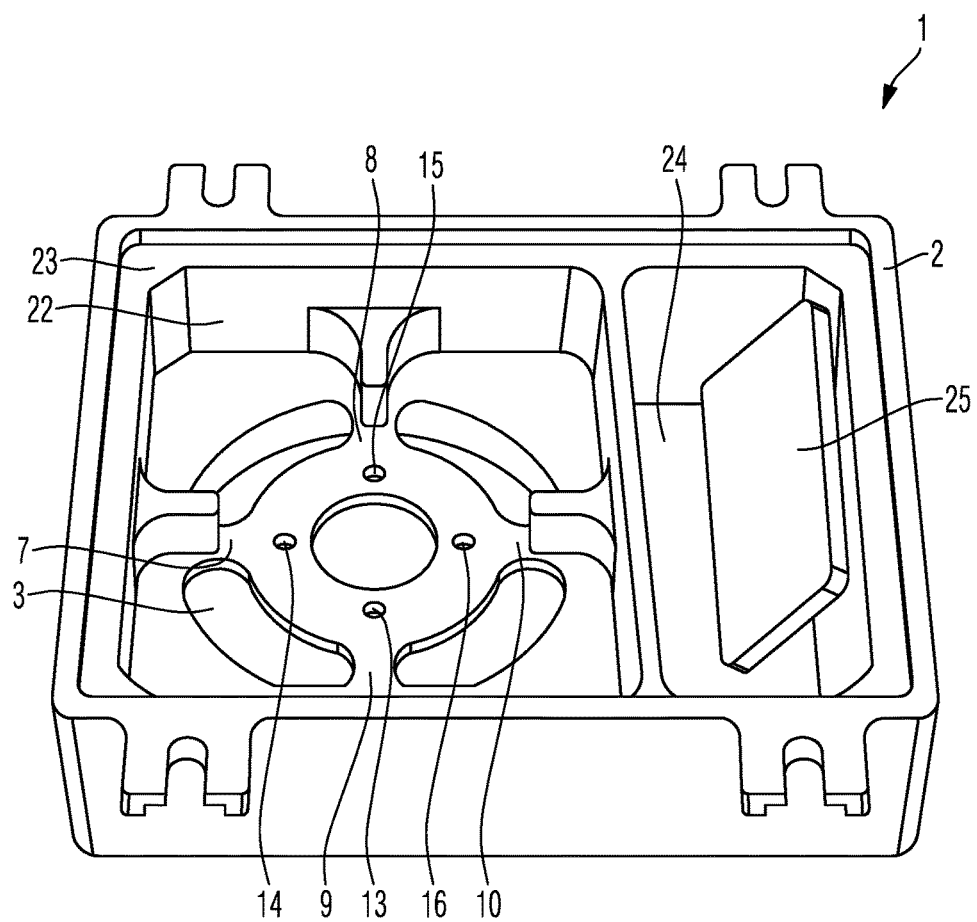
FIG. 2 shows another perspective view of the embodiment of the housing of FIG. 1.

In FIG. 2 the first housing section 2 of FIG. 1 is shown from the back. The first housing section 2 comprises a cavity 22 on the back of the membrane opening 3 and a circuit compartment 24 next to the cavity 22. The circuit compartment 24 can e.g. be used to accommodate a driving circuit 25, which can be coupled electrically to a coil of the sound generation membrane to drive the sound generation membrane.

A further recess 23 is provided on the edge of the first housing section 2. The recess 23 can accommodate a second housing section (see FIGS. 3 and 4) which hermetically closes the first housing section 2 to form the housing 1.

The driving circuit 25 can comprise any circuitry needed in the communication device. Therefore, the first and second housing sections 2, 23 together with the elements that form the speaker and the driving circuit 25 can form the communication device. The circuit compartment 24 can e.g. be provided with a sealed access, e.g. to provide electrical power and/or data signals to the driving circuit 25.

FIG. 3 shows a cross sectional view of another embodiment of a housing 30.

The housing 30 comprises a first housing section 31, which as in FIGS. 1 and 2, comprises a membrane opening 32, which is covered by a cover 46 to protect the sound generation membrane 40 from environmental effects. It is to be understood that the cover 46 can comprise holes or grooves or the like, which allow sound waves to pass through the cover 46.

The first membrane support 33 is provided around the membrane opening 32 and carries the sound generation membrane 40. To allow actuation, i.e. vibration, of the sound generation membrane 40, the sound generation membrane 40 comprises a coil 43, which can also be called voice coil or voice coil bobbin.

The first housing section 31 furthermore comprises in the center below the sound generation membrane 40 the magnet carrying support 34 with a dedicated second membrane support 39 on its top outer surface. The magnet carrying support 34 is supported by stands 35, 36. In contrast to the screws, which hold the permanent magnet in FIGS. 1 and 2, the permanent magnet 42 is molded into the magnet carrying support 34. No further fixation elements need to be provided to hold the permanent magnet 42. It is understood that nevertheless any fixation element can be provided to increase the mechanical stability of the permanent magnet assembly.

Below the magnet carrying support 34 and the stands 35, 36 the first housing section 31 comprises the circuit compartment 37. The driving circuit 38 is provided on the second housing section 44, which can be coupled to the back of the first housing section 31 to close and/or seal the housing 30.

The electrical connection between the driving circuit 38 and the coil 43 can e.g. be provided via electrical wires, which can be fed through a cable feedthrough 45 in the stand 36.

The housing 50 of FIG. 4 is based on the housing 30. However, instead of providing the circuit compartment below the membrane opening, the circuit compartment 55 is provided sideways of the membrane 58 and magnet 60 assembly. Therefore, no separate stands are provided to hold the magnet carrying support 54, which is formed in the first housing section 51.

The two configurations of FIG. 3 and FIG. 4 provide compactness of the housing in different directions. Further, if the housing 1 is e.g. fixed to a wall, the variant of FIG. 4 allows accessing the circuit compartment 55 even if the housing is screwed to a wall.

The housings 1, 30 and 50 of FIGS. 1-4 are schematic drawings. Naturally, further elements, like e.g. sealings, fixation elements or the like can be provided. Furthermore, any fixation method or device, which is explained above can also be replaced by any other fixation method or device. That means that gluing can e.g. be substituted by soldering, clamping or any other fixation method or device.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein. In the above examples sound generation membranes 40, 58 have been shown. It is to be understood, that the same principles as shown above can be applied to sound recording or microphone membranes. In fact the sound generation membranes 40, 58 can without changes to the invention be used as microphone membranes, if a respective electronic is used in conjunction with the sound generation membranes 40, 58.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to explain the principles of the invention and its practical applications best, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF USED REFERENCE SIGNS 1, 30, 50 housing
2, 31, 51 first housing section
3, 32, 52 membrane opening
4 circumference
5, 33, 53 first membrane support
6, 34, 54 magnet carrying support
7-10, 35, 36 stands
11, 12 glue
13-16 drill holes
17 recess
18-21 drill holes
22 cavity
23 recess
24, 37, 55 circuit compartment
25, 38, 56 driving circuit
26, 39, 57 second membrane support
27 hole
40, 58 sound generation membrane
41, 59 centering membrane
42, 60 permanent magnet
43, 61 coil
44, 62 second housing section
45, 63 cable feedthrough
46, 64 cover
65 opening

The invention claimed is:

1. A housing (1, 30, 50) for a communication device, comprising:
    a first housing section (2, 31, 51) formed as a single element and comprising:
        a first membrane support (5, 33, 53);
        a membrane opening (3, 32, 52), defined by the circumference (4) of the first membrane support (5, 33, 53) wherein the first membrane support is configured to couple to a sound membrane (40, 58), and wherein the first housing section (2, 31, 51) forms a closed chassis except for the membrane opening (3, 32, 52),
        a magnet carrying support (6, 34, 54) configured to support a magnet in the housing (1, 30, 50) such that the magnet is positioned below and concentric with the membrane opening (3, 32, 52), and
    a second housing section (44, 62), which is configured to couple to the first housing section (2, 31, 51) and close the first housing section (2, 31, 51) except for the membrane opening (3, 32, 52).

2. The housing according to claim 1, wherein the magnet carrying support (6, 34, 54) comprises a number of magnet fastening elements (13-16) configured to fasten the magnet to the magnet carrying support (6, 34, 54).

3. The housing according to claim 2, wherein the magnet fastening elements (13-16) comprise drill holes (13-16) for screwing the magnet to the magnet carrying support (6, 34, 54) and/or clamps configured to clamp the magnet to the magnet carrying support (6, 34, 54) and/or clips configured to hold the magnet onto the magnet carrying support (6, 34, 54).

4. The housing according to claim 1, comprising a permanent magnet (42, 60), which is coupled to the magnet carrying support (6, 34, 54).

5. The housing according to claim 4, wherein the magnet is at least partially molded into the magnet carrying support (6, 34, 54).

6. The housing according to claim 1, comprising a second membrane support (26, 39, 57), which is:
    formed with the same single element of the first housing section;
    positioned between and concentric to the magnet carrying support (6, 34, 54) and the first membrane support and;
    configured to couple to a centering membrane (41, 59).

7. The housing according to claim 6, wherein the second membrane support (26, 39, 57) comprises one surface of the magnet carrying support (6, 34, 54).

8. The housing according to claim 1, comprising a sound membrane (40, 58), which is coupled to the first membrane support (5, 33, 53), and comprising a centering membrane (41, 59), which is coupled to both of the sound membrane (40, 58) and the second membrane support (26, 39, 57).

9. The housing according to claim 8, wherein the sound membrane (40, 58) comprises a coil (43, 61), which is positioned over the magnet carrying support (6, 34, 54).

10. The housing according to claim 8, wherein the sound membrane (40, 58) and the centering membrane (41, 59) are formed with each other and/or wherein the sound membrane (40, 58) and the centering membrane (41, 59) comprise paper and/or tissue and/or plastic and/or wherein the sound membrane (40, 58) and the centering membrane (41, 59) comprise fiber reinforcements.

11. The housing according to claim 1, wherein the first housing section (2, 31, 51) comprises a cable feedthrough (45, 63), especially a sealed cable feedthrough (45, 63).

12. The housing according to claim 1, comprising a circuit compartment (24, 37, 55) for a driving circuit (25, 38, 56).

13. A communication device, comprising a housing (1, 30, 50), the housing comprising:
    a first housing section (2, 31, 51) formed as a single element and comprising:
        a first membrane support (5, 33, 53);
        a membrane opening (3, 32, 52), defined by the circumference (4) of the first membrane support (5, 33, 53) wherein the first membrane support is configured to couple to a sound membrane (40, 58), and
        wherein the first housing section (2, 31, 51) forms a closed chassis except for the membrane opening (3, 32, 52),
        a magnet carrying support (6, 34, 54) configured to support a magnet in the housing (1, 30, 50) such that the magnet is positioned below and concentric with the membrane opening (3, 32, 52), and a second housing section (44, 62), which is configured to couple to the first housing section (2, 31, 51) and close the first housing section (2, 31, 51) except for the membrane opening (3, 32, 52).

14. The communication device according to claim 13, wherein the magnet carrying support (6, 34, 54) comprises a number of magnet fastening elements (13-16) configured to fasten the magnet to the magnet carrying support (6, 34, 54), especially wherein the magnet fastening elements (13-16) comprise drill holes (13-16) for screwing the magnet to the magnet carrying support (6, 34, 54) and/or clamps configured to clamp the magnet to the magnet carrying support (6, 34, 54) and/or clips configured to hold the magnet onto the magnet carrying support (6, 34, 54).

15. The communication device according to claim 13, the housing comprising a permanent magnet (42, 60), which is coupled to the magnet carrying support (6, 34, 54).

16. The communication device according to claim 15, wherein the magnet is at least partially molded into the magnet carrying support (6, 34, 54).

17. The communication device according to claim 13, the housing comprising a second membrane support (26, 39, 57), which is:
  formed with the same single element of the first housing section;
  positioned between and concentric to the magnet carrying support (6, 34, 54) and the first membrane support;
  configured to couple to a centering membrane (41, 59) and;
  comprises one surface of the magnet carrying support (6, 34, 54).

18. The communication device according to claim 13, the housing comprising a sound membrane (40, 58), which is coupled to the first membrane support (5, 33, 53), and comprising a centering membrane (41, 59), which is coupled to the sound membrane (40, 58) and the second membrane support (26, 39, 57).

19. The communication device according to claim 18, wherein the sound membrane (40, 58) comprises a coil (43, 61), which is positioned over the magnet carrying support (6, 34, 54).

20. The communication device according to claim 18, wherein the sound membrane (40, 58) and the centering membrane (41, 59) are formed with each other and/or wherein the sound membrane (40, 58) and the centering membrane (41, 59) comprise paper and/or tissue and/or plastic and/or wherein the sound membrane (40, 58) and the centering membrane (41, 59) comprise fiber reinforcements.

21. The communication device according to claim 13, the housing comprising a circuit compartment (24, 37, 55) for a driving circuit (25, 38, 56).

* * * * *